US006847326B2

(12) United States Patent
Harigae et al.

(10) Patent No.: US 6,847,326 B2
(45) Date of Patent: Jan. 25, 2005

(54) GPS DEVICE FOR MEASURING WAVE HEIGHT AND CURRENT DIRECTION AND SPEED AND GPS SYSTEM FOR MEASURING WAVE HEIGHT AND CURRENT DIRECTION AND SPEED

(75) Inventors: Masatoshi Harigae, Tokyo (JP); Isao Yamaguchi, Tokyo (JP); Tokio Kasai, Tokyo (JP)

(73) Assignee: National Aerospace Laboratory of Japan, Tokyo (JP)

( * ) Notice: Subject to any disclaimer, the term of this patent is extended or adjusted under 35 U.S.C. 154(b) by 0 days.

(21) Appl. No.: 10/404,088

(22) Filed: Apr. 2, 2003

(65) Prior Publication Data

US 2003/0189513 A1 Oct. 9, 2003

(30) Foreign Application Priority Data

Apr. 5, 2002 (JP) ........................................ 2002-103593

(51) Int. Cl.[7] .............................................. H04B 7/185
(52) U.S. Cl. ........................... 342/357.07; 342/357.06; 342/357.09; 342/357.13
(58) Field of Search ....................... 342/357.06, 357.12, 342/357.13, 357.09

(56) References Cited

U.S. PATENT DOCUMENTS

| | | | | | |
|---|---|---|---|---|---|
| 5,355,140 | A | * | 10/1994 | Slavin et al. ........... | 342/357.09 |
| 5,408,238 | A | * | 4/1995 | Smith ..................... | 342/357.09 |
| 5,452,216 | A | * | 9/1995 | Mounce ................. | 342/357.14 |
| 5,577,942 | A | * | 11/1996 | Juselis ................... | 367/4 |
| 5,691,957 | A | * | 11/1997 | Spiesberger ............ | 367/3 |
| 6,558,216 | B2 | * | 5/2003 | Yerazunis et al. ....... | 441/11 |

FOREIGN PATENT DOCUMENTS

| | | |
|---|---|---|
| JP | 10-185564 | 7/1998 |
| JP | 2000-103391 | 4/2000 |
| JP | 2001-4649 | 1/2001 |

OTHER PUBLICATIONS

T.C. Wilson et al., A Lagrangian drifter with inexpensive wide area differential GPS positioning, Conference Proceedings MTS/IEEE, Prospects for the 21st Century, vol. 2, p. 851–856, Sep. 1996.*
G.Q. Hein et al., Determination of instantaneous sea surface, wave heights, and ocean currents using satellite observations of the Global Positioning System, Marine–Geodesy (USA), vol. 14, No. 3–4, p. 217–24, 1990.*
J.–H. Hu et al., Proceedings of the IEEE Fifth Working Conference on Current Measurement, p. 169–176, 1995.*
Translation of JP 10–185564 A.*
Kenji Itani et al., ION GPS 2000, pp. 1467–1475, Sep. 19–22, 2000, Salt Lake City, UT.

* cited by examiner

*Primary Examiner*—Thomas H. Tarcza
*Assistant Examiner*—F H Mull
(74) *Attorney, Agent, or Firm*—Westerman, Hattori, Daniels & Adrian, LLP

(57) ABSTRACT

The present invention provides a GPS device for measuring the wave height and current direction and speed, which is capable of accurately measuring the wave height (height of the waves) and current direction and speed (tidal current) in any point on the sea, ocean, lake, or marsh, and to a system using such a device. The GPS receiver 2 of the GPS device 1 for measuring the wave height and current direction and speed processes the GPS signals received with the GPS antenna 3 and measures the three-dimensional position of antenna 3. The three-dimensional position data are recorded by the data recording unit 4 connected to the GPS receiver 2. When the floating body 5 having those devices 2–4 installed thereon floats on the sea or ocean, it moves together with the waves and tidal current in the present location. The software 7 for conducting high-pass filter processing and smoothing processing is installed in the data processing unit 6, and the data on the wave height and current direction and speed are output, while the errors are being removed from the three-dimensional position data recorded in the data recording unit 4.

9 Claims, 2 Drawing Sheets

FIG. 1-A
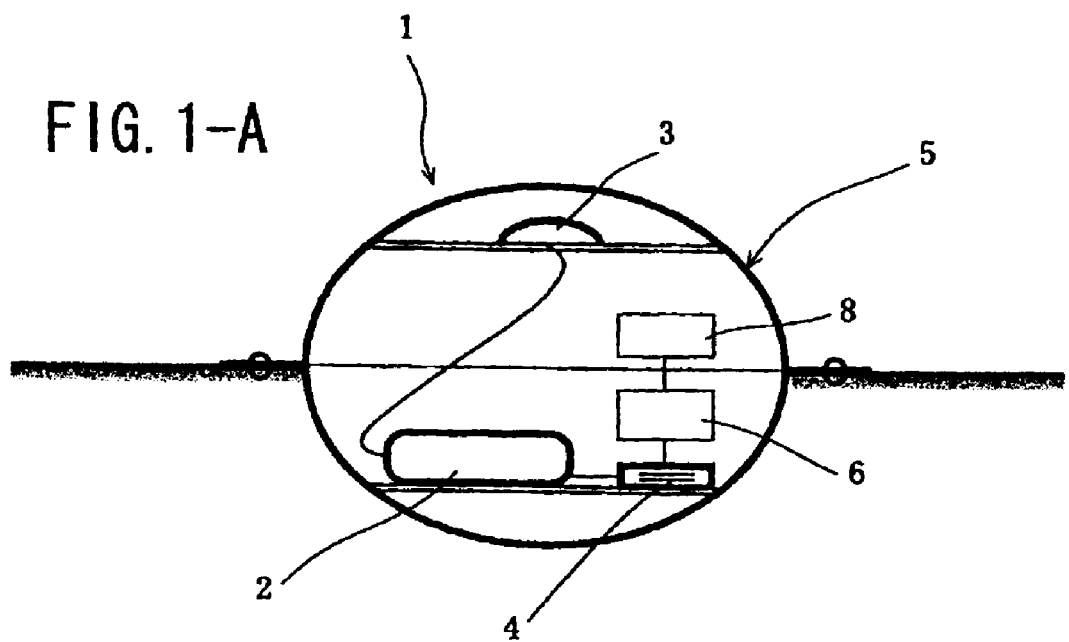
FIG. 1-B
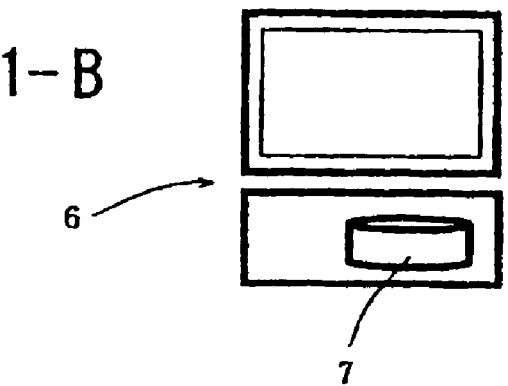

FIG. 2-A
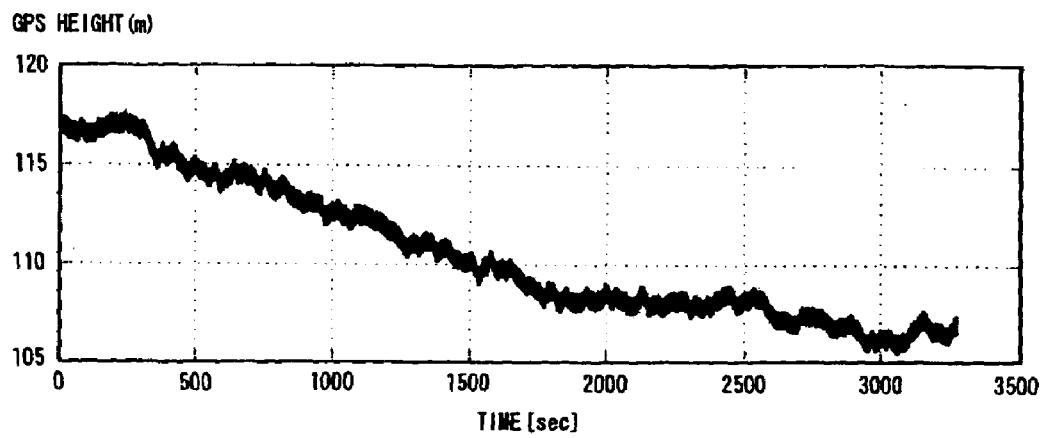
FIG. 2-B
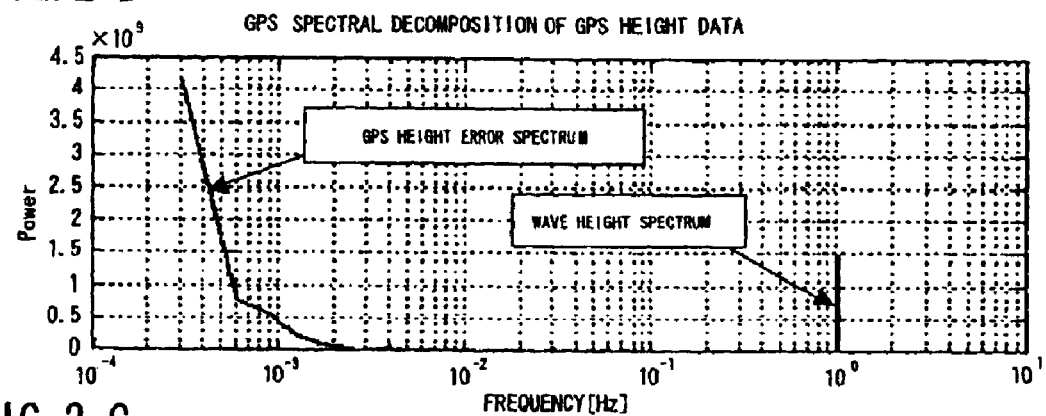
FIG. 2-C
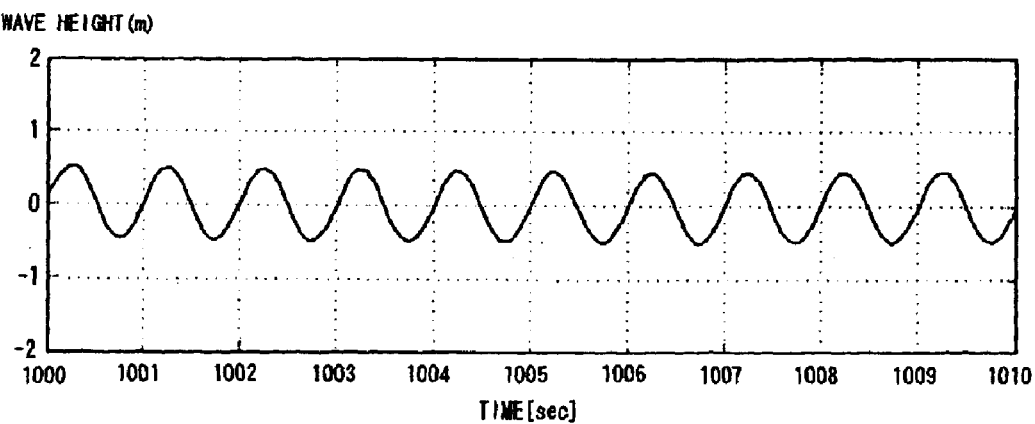

GPS DEVICE FOR MEASURING WAVE HEIGHT AND CURRENT DIRECTION AND SPEED AND GPS SYSTEM FOR MEASURING WAVE HEIGHT AND CURRENT DIRECTION AND SPEED

BACKGROUND OF THE INVENTION

1. Field of the Invention

The present invention relates to a GPS device for measuring the wave height and current direction and speed, which can be used as an observation device such as an oceanological observation device by measuring the height of the waves and the frequency spectrum thereof, and to a GPS system for measuring the wave height and current direction and speed using such a device.

2. Description of the Related Art

Marine research, which is essential for the survival of people, has been conducted with the object of collecting fundamental data for designing vessels, predicting weather changes by measuring tidal currents, and preventing disasters at sea. Devices for measuring the wave height and current direction and speed have been suggested as oceanological observation devices suitable for such marine research. Devices of four types for measuring the wave height, that is, ultrasonic, hydraulic, step-type, and accelerometric devices, have already found practical use. In the ultrasonic and hydraulic devices for measuring the wave height, the wave height is measured by a method of measuring the distance to the sea surface by emission of ultrasonic waves from an observation device immersed to the sea bottom, or measuring the height of the sea surface by detecting the water pressure. In step-type devices for measuring the wave height, the wave height is measured by detecting the height of the sea surface with a row of electrodes arranged in the height direction on the shore or the like. In the accelerometric devices for measuring the wave height, the wave height is measured by detecting the acceleration of the vertical movement of a floating body with an accelerometer disposed on the floating body and twice integrating the detected acceleration.

However, a variety of problems were encountered when the devices for measuring the wave height of those four types were used for accurate measurement of wave height in a random point on the sea or ocean. Thus, with the ultrasonic and hydraulic devices for measuring the wave height, limitation is placed on the measurable distance from the sea bottom to the sea surface. Therefore, the wave height could be measured only in the sea with a depth of several dozen meters and the usability range of the devices was limited. The step-type devices for wave height measurement required the installation of an electrode row on the shore and the like. Therefore, the device could be used only in harbors or bays. By contrast, the accelerometric devices for measuring the wave height have an unlimited utilization range because the floating body can float in any point. However, the problem inherent to devices of this type was that the detected vertical acceleration data contained errors and those errors were accumulated by two-time integration, thereby degrading the accuracy of wave height measurements. Further, the common problem of the devices of those four types was that the cost of the entire device was high because it used expensive measurement sensors.

In the field of devices for measuring the current direction and speed, electromagnetic measurement devices have been implemented. Such devices measure the tidal current as changes in the electric field, but because they are installed in an immersed state on the sea bottom, the current direction and speed in the vicinity of sea surface cannot be measured. Furthermore, because measurements are conducted in a single point, the tidal current in a wide range cannot be measured. One more problem is that the entire device is very expensive because costly sensors are employed.

Japanese Patent Application Laid-open No. 10-185564 has disclosed a method for measuring the wave height. With this method for measuring the wave height, a fixed station for receiving electromagnetic waves emitted by a GPS artificial satellite is installed in a known position on the shore, at least one receiver for receiving electromagnetic waves emitted by a GPS artificial satellite and output electromagnetic waves of the fixed station is installed on a buoy floating on the sea surface and anchored to the sea bottom, a relative position of the receiver with respect to the fixed station is measured by a static positioning method, changes in the relative position are measured by a kinematic positioning method, and the wave height is computed based on the changes in the relative position. However, with the kinematic positioning method, a GPS station serving as a reference point disposed on the ground is required and the base line length to the measurement point is limited to no more than 10 km. Therefore, from the standpoint of practical use and cost, the problem is that the system is difficult to construct and use.

As described hereinabove, a variety of drawbacks are inherent to the devices for measuring the wave height and current direction and speed that have already found practical use. Accordingly, the problem that should be solved is in measuring directly the wave height and the flow of fluid in the vicinity of the water surface, which changes the position of a floating body, at any point on the sea, a lake or a marsh by conducting accurate measurements of the three-dimensional position of the floating body that flows on the sea, lake, or marsh.

SUMMARY OF THE INVENTION

It is an object of the present invention to overcome the above-described drawbacks and to provide at a low cost a device for measuring the wave height and current direction and speed, which is capable of accurately measuring the wave height and current direction and speed in any position on the sea or ocean and also a system for measuring the wave height and current direction and speed which uses such a device.

More specifically, it is an object of the present invention to construct at a low cost a device and system for measuring the wave height and current direction and speed that can measure the wave height and current direction and speed with a high accuracy in any point on the sea and ocean or fresh water and can be employed for a long time, by using low-cost measurement sensors and without complicating the device for measuring the wave height and current direction and speed.

In order to attain this object, the GPS device for measuring the wave height and current direction and speed comprises a floating body capable of floating on a fluid such as seawater, fresh water, and the like, a GPS (global positioning system) antenna for receiving GPS signals, a GPS receiver for processing the GPS signals received by the GPS antenna and measuring the three-dimensional position, and a data recording unit for recording the position data relating to the three-dimensional position measured by the GPS receiver, wherein the GPS antenna, the GPS receiver, and the data recording unit are installed on the floating body.

With such a GPS device for measuring the wave height and current direction and speed, because the floating body can float on seawater or fresh water, it will drift with waves, current, or tide when allowed to float on the sea, ocean, lake, marsh, or river, the movement of the floating body will be measured as three-dimensional position data by receiving the GPS signals with the GPS receiver installed on the floating body, and the position data relating to the measured three-dimensional position will be automatically recorded at least with the data recording unit. The current and swinging motion of the sea surface or water surface can be detected by means of the changes in the three-dimensional position of the floating body and the wave height and current direction and flow in fresh water or sea can be measured simultaneously. Because the cost of GPS antennas and GPS receivers has recently dropped and because only one such unit will suffice for the device for measuring the wave height and current direction and speed, they can be supplied as sensors at a low cost. As a result, a GPS device for measuring the wave height and current direction and speed can be implemented at a low cost and without complicating the structure. Further, because the GPS antenna, GPS receiver, and data recording unit are installed on the floating body, the position of the floating body can be directly measured by simply placing the floating body on seawater or fresh water, no limitation being placed on the zone for placing the measurement sensor. Three-dimensional positional observations can be thereafter conducted automatically in an unmanned mode and with a high measurement accuracy and the wave height and current direction and speed can be measured with a high accuracy.

In such a GPS device for measuring the wave height and current direction and speed, a data processing unit for processing the position data extracted from the data recording unit and calculating the wave height and current direction and speed in the point where the floating body is floating can be installed on the floating body. In the GPS device for measuring the wave height and current direction and speed that has been thus constructed, because the data processing unit for processing the position data extracted from the data recording unit is installed on the floating body, the processing of the position data and calculation of the wave height and current direction and speed in the point where the floating body is floating can be executed on the GPS device for measuring the wave height and current direction and speed.

In such a GPS device for measuring the wave height and current direction and speed, the data processing unit preferably conducts high-pass filter processing of the position data for extracting only the wave height components present in the high-frequency region in order to calculate the wave height, and conducts smoothing processing of the position data for extracting only the current direction and current speed components in order to calculate the current direction and current speed. Because the position data are measured only with the GPS receiver, they contain a position error of several dozen of meters which is caused by the GPS ephemeris error, atmosphere delay error, multipath error, and the like. Therefore, when the wave height is measured, the wave height cannot be detected with sufficient accuracy based only on the height data of the position data.

It is, however, noteworthy that measuring the absolute height of waves is not necessary to determine the wave height. Thus, the wave height can be measured if changes in the height of waves are measured. Moreover, when changes in the height of waves (become the wave height) were evaluated in the frequency regions, they were found to be present in the frequency region higher than that of the long-period (low-frequency) position error of GPS. A high-pass filter, which is used to employ this characteristic, has a function of extracting only the wave height component in the frequency range and removing the position error in the low-frequency range contained in the GPS position data and enables the wave height measurements that could not be conducted heretofore with the GPS receiver alone.

On the other hand, in case of current direction and speed measurements, the frequency range of data on current direction and speed is in the frequency band even lower than that of the position error of the data measured only with the GPS. The smoothing processing employs this characteristic and has a function of smoothing the position data, removing the high-frequency components, extracting only the current direction and speed component in the frequency range, and removing the position error contained in the GPS position data and enables the current direction and speed measurements that could not be conducted heretofore with the GPS receiver alone.

In such a GPS device for measuring the wave height and current direction and speed, a cut-off frequency of the high-pass filter and smoothing time of the smoothing processing can be set in the data processing unit so as to remove the errors contained in the position data. Such a setting of cut-off frequency and smoothing time in the data processing unit is appropriately conducted by taking into account the characteristics that appear in the position data, so as to remove most effectively the position error of measurement data obtained only with the GPS.

In this GPS device for measuring the wave height and current direction and speed, a transmitter for transmitting the computed data relating to the wave height and current direction and speed that have been calculated by the data processing unit is installed on the floating body. Installing the transmitter for transmitting the computed data relating to the wave height and current direction and speed on the floating body makes it possible to obtain the data relating to the wave height and current direction and speed from a remote location, without recovering the data processing unit installed on the floating body.

Further, the GPS system for measuring the wave height and current direction and speed in accordance with the present invention is composed of a GPS device for measuring the wave height and current direction and speed, comprising a floating body capable of floating on a fluid such as seawater, fresh water, and the like, a GPS antenna for receiving GPS signals, a GPS receiver for processing the GPS signals received by the GPS antenna and measuring the three-dimensional position, a data recording unit for recording the position data relating to the three-dimensional position measured by the GPS receiver, and a transmitter for transmitting the position data, wherein the GPS antenna, the GPS receiver, the data recording unit, and the transmitter are installed on the floating body, and a base station equipped with a receiver for receiving the position data transmitted from the transmitter and a data processing unit for processing the received position data and calculating the wave height and current direction and speed in the point where the floating body is floating.

With such a GPS system for measuring the wave height and current direction and speed, because the GPS device for measuring the wave height and current direction and speed, comprises the GPS antenna, GPS receiver, data recording unit, and transmitter, the unprocessed position data observed by the GPS system can be directly transmitted to the base station provided with a receiver. Because the base station is provided with the data processing unit, the received position data can be processed and the wave height and current direction and speed in the point where the floating body is floating can be calculated.

Another GPS system for measuring the wave height and current direction and speed in accordance with the present invention is composed of a GPS device for measuring the wave height and current direction and speed, comprising a floating body capable of floating on a fluid such as seawater, fresh water, and the like, a GPS antenna for receiving GPS signals, a GPS receiver for processing the GPS signals received by the GPS antenna and measuring the three-dimensional position, a data recording unit for recording the position data relating to the three-dimensional position measured by the GPS receiver, a data processing unit for processing the position data and calculating the wave height and current direction and speed in the point where the floating body is floating, and a transmitter for transmitting the computed data relating to the wave height and current direction and speed, wherein the GPS antenna, the GPS receiver, the data recording unit, the data processing unit and the transmitter are installed on the floating body, and a base station equipped with a receiver for receiving the computed data transmitted from the transmitter.

With such a GPS system for measuring the wave height and current direction and speed, because the GPS device for measuring the wave height and current direction and speed, comprises the GPS antenna, GPS receiver, data recording unit, data processing unit, and transmitter, the computed data obtained by conducting observations with the GPS system and calculating the wave height and current direction and speed in the point where the floating body is floating are transmitted to the base station provided with a receiver. The received computed data can be immediately used in the base station.

In any of the above-described GPS systems for measuring the wave height and current direction and speed, the data processing unit can have installed therein a processing software for conducting the high-pass filter processing and smoothing processing of the position data for calculating the wave height and current direction and speed. Conducting the high-pass filter processing and smoothing processing of the position data with the processing software makes it possible to remove the GPS ephemeris error, atmosphere delay error, multipath error, and the like, contained in the height data for the floating body measured with the GPS receiver and to increase the accuracy in the height direction obtained by the independent GPS navigation method. In this case, appropriately determining the cut-off frequency of the high-pass filter enables the wave height to be measured with a high accuracy based on the swinging spectrum of the waves in the vertical direction, and appropriately determining the smoothing time (or a cut-off frequency of a low-pass filter) in smoothing processing (or low-pass filter processing) of the data relating to position in a horizontal plane enables the current direction and speed to be measured with a high accuracy based on the current information in a horizontal plane of the waves.

BRIEF DESCRIPTION OF THE DRAWINGS

FIG. 1 is a schematic cross-sectional view illustrating the structure of an embodiment of the GPS device for measuring the wave height and current direction and speed in accordance with the present invention; and FIG. 2 is a graph illustrating a measurement example relating to wave height measurements conducted with the GPS device for measuring the wave height and current direction and speed in accordance with the present invention. FIG. 2-A shows data representing changes in GPS height with time, FIG. 2-B is spectral decomposition of the GPS height data shown in FIG. 2-A, and FIG. 2-C illustrates changes with time in the wave height after error removal.

DESCRIPTION OF THE PREFERRED EMBODIMENTS

The GPS device for measuring the wave height and current direction and speed and GPS system for measuring the wave height and current direction and speed in accordance with the present invention will be described below with reference to the appended drawings. FIG. 1 is a schematic view illustrating an embodiment of the GPS device for measuring the wave height and current direction and speed in accordance with the present invention, wherein the inside of the GPS device for measuring the wave height and current direction and speed is shown in the cross section thereof.

With the GPS device 1 for measuring the wave height and current direction and speed (for the sake of simplicity it will be hereinbelow referred to as "measurement device 1") as shown in FIG. 1-A and a measurement system using the measurement device 1, the measurement device 1 floats on the surface of ocean, sea, lake, marsh, river, and the like, without being anchored to the sea bottom or the like. Therefore, the device drifts with the tide or current. Three-dimensional position data obtained with GPS are used as means for measuring the wave height and current direction and speed at the same time. Thus, a GPS receiver 2 processes the GPS signals received with a GPS antenna 3 and measures a three-dimensional position of GPS antenna 3. The three-dimensional position data obtained with the GPS receiver 2 are recorded in a data recording unit 4 connected to the GPS receiver 2. Devices 2–4 are installed in a sealed state inside a floating body 5. If the measurement device 1 is caused to float in any place on the ocean, sea, lake, marsh, river, and the like, the measurement device 1 can move with actual waves or the flow of tide or current. As shown in FIG. 1-B, a data processing unit 6 has installed therein processing software 7 for conducting high-pass filter processing or the like. Three-dimensional position data recorded by the data recording unit 4 are processed with the processing software 7 in the data processing unit 6, the height of waves and the direction and speed of current on which the floating body 5 floats are calculated, and the calculated data are output.

The calculated data that were calculated by the data processing unit 6 and relate to the height of waves and the direction and speed of current on which the floating body 5 floats are directly transmitted from a transmitter 8 installed on the floating body 5 and are received directly or via a relay station by a base station disposed on a ship, aircraft, artificial satellite, ground base, or the like. The measurement device 1 and the base station constitute the GPS system for measuring the wave height and current direction and speed. Transmission with the transmitter 8 may be conducted at constant intervals or can be conducted in a real time mode each time the calculation is made.

In the GPS device 1 for measuring the wave height and current direction and speed and GPS system for measuring the wave height and current direction and speed, the data recording unit 4 is provided in the measurement device 1, but it is not necessary that the units up to the data processing unit 6 shown in FIG. 1-B be provided therein. In this case, the position data recorded by the data recording unit 4 can be appropriately extracted and immediately transmitted to the case station with the transmitter 8 installed on the floating body 5. In such a configuration, the base station comprises a receiver for receiving the transmitted position data and a data processing unit for calculating the wave height and current direction and speed by processing the position data received by the receiver (in the aforesaid example, this data processing unit may be identical to the data processing unit 6 installed on the floating body 5). The wave height and current direction and speed detected by the floating body 5 are calculated by the data processing unit in the base station. When the measurement device 1 is not provided with the transmitter 8, the position data recorded by the data recording unit 4 are recovered at the same time as the measurement device 1 is recovered.

FIG. 2 is a graph illustrating a measurement example that has been measured with the GPS device 1 and system for measuring the wave height and current direction and speed in accordance with the present invention, this example relating to wave height measurements. FIG. 2-A shows the height data measured with the GPS receiver 2 installed on the floating body 5 which floats on waves with a height of 0.5 m and a period of 1 Hz. Because an independent GPS navigation method based on the low-cost GPS receiver 2 is employed as means for position measurement in the measurement device 1, the measurement data include not only the vertical movement (height 0.5 m) of floating body 5 on the waves, but also a position error exceeding 10 m and caused by the GPS ephemeris error, atmosphere delay error, multipath error, and the like. It is, therefore, clear that the structure using only the GPS receiver 2 is insufficient for measuring the wave height.

FIG. 2-A also suggests that the position error exceeding 10 m changes slowly with a period of no less than 1 hour. Thus, when the position error is viewed from the standpoint of frequency range, the major part of the error is located in the low-frequency band. FIG. 2-B shows in which region, in terms of frequency components thereof, the error data are present, those results being yielded by spectral analysis of the measurement data obtained with GPS. This figure demonstrates that the major part of the error is located in the low-frequency band. On the other hand, the wave (wave height) frequency is found to be present in a high-frequency band of 1 Hz, which is higher than that of the position error.

High-pass filter processing of position data of the GPS receiver for wave height measurement is implemented with the processing software 7. By processing the position data of the GPS receiver obtained as a time series, the high-pass filter functions to delete the data components belonging to a low-frequency band and to leave the data components belonging to a high-frequency band. As a result, the position error of the GPS data can be removed and the wave height data can be separated and extracted. Appropriately determining the cut-off frequency of the high-pass filter in this process makes it possible to measure the wave height with a high accuracy by removing the GPS measurement error and not removing the swinging spectrum of the waves in the vertical direction.

FIG. 2-C shows the results obtained by implementing the high-pass filter processing in the processing software 7. As an example, a second-order high-pass filter was employed that had a cut-off frequency of 0.02 Hz. As a result, as follows from FIG. 2-C, the error contained in the GPS position data is practically removed and only the wave height component derived from the vertical movement of floating body 5 is extracted. The wave height measurement error caused at this time by GPS has been improved to 0.08 m, which is almost equal to the measurement accuracy attained with the kinematic positioning method disclosed in the above-mentioned Japanese Patent Application Laid-open No. 10-186664. With the system disclosed in this open publication, two GPS receivers are required and the distance from the ground is limited to 10 km, whereas with the GPS wave height measurements in accordance with the present invention, using the processing software 7 having a high-pass filter makes it possible to attain the same accuracy as in the system disclosed in the aforesaid publication, but with only one receiver and without limitations.

The processing software 7 also conducts smoothing processing (or low-pass filter processing for passing only low-frequency components of horizontal plane position data) as a processing relating to current direction and speed. Setting the smoothing time (or cut-off frequency of the low-pass filter) to about 24 hours makes it possible to measure the current direction and speed with a high accuracy, so that information relating to the flow in the horizontal plane of the waves is not removed.

In the above-described embodiment, a high-pass filter was used for filter processing of wave height data. However, the present invention is not limited thereto and the measurement error of the independent GPS navigation method can be removed and wave height and current direction and speed measurements can be conducted by using smoothing and low-pass filter producing a similar effect. Furthermore, in the above-described embodiment the measurement device 1 drifted with the tide or current, but it can be also placed on an iceberg or drift ice and the degree of melting into the seawater can be detected by changes in the height thereof.

The GPS device for measuring the wave height and current direction and speed and GPS system for measuring the wave height and current direction and speed in accordance with the present invention have the above-described structure. Therefore, the wave height and current direction and speed on the surface of ocean, sea, lake, marsh, river, and the like, where the measurement device is floating can be measured accurately and simultaneously by measuring a three-dimensional position relating to the GPS antenna as the movement of the floating body with the GPS receiver installed on the measurement device and then removing the error of independent GPS navigation from the three-dimensional position data provided by GPS with a processing software. In the measurement device and system in accordance with the present invention, only one low-cost GPS receiver is required as a sensor, and the measurement device and measurement system can be designed without complicating the structure. Further, employing processing software for conducting high-pass filter processing and smoothing of three-dimensional position data provided by GPS as means for maintaining a high accuracy makes it possible to leave the necessary information, while removing the GPS measurement error. In addition, employing a data recording unit that can record large-volume data with a low power consumption allows the data recording unit to conduct long-term recording of three-dimensional position data provided by GPS and to implement the long-term operation. Moreover, the measurement device can be implemented at a low cost by using a simple configuration comprising a floating body, a GPS receiver, and a data recording unit.

What is claimed is:

1. A GPS device for measuring wave height and current direction and speed, comprising:

a floating body capable of floating on water;

a GPS antenna for receiving GPS signals;

a single GPS receiver for processing said GPS signals received by said GPS antenna and measuring the three-dimensional absolute position; and a data recording unit for recording the position data relating to said three-dimensional position measured by said GPS receiver, wherein said GPS antenna, said GPS receiver, and said data recording unit are installed on said floating body;

wherein a transmitter for transmitting said position data is installed on said floating body; and wherein a data processing unit is installed on said floating body for processing said position data extracted from said data recording unit and calculating the wave height and the current direction and speed at the point where said floating body is floating.

2. The GPS device for measuring wave height and current direction and speed according to claim 1, wherein said data processing unit conducts high-pass filter processing of said position data for extracting only the wave height components present in a high-frequency region in order to calculate said wave height, and conducts smoothing processing of said position data for extracting only the current direction and current speed components in order to calculate said current direction and current speed.

3. The GPS device for measuring wave height and current direction and speed according to claim 2, wherein said data processing unit is capable of setting a cut-off frequency of said high-pass filter and smoothing time of said smoothing processing for removing the errors contained in said position data.

4. The GPS device for measuring wave height and current direction and speed according to claim 1, wherein said transmitter is also for transmitting data relating to said wave height and said current direction and speed calculated by said data processing unit is installed on said floating body.

5. A GPS system for measuring wave height and current direction and speed comprising:

a GPS device for measuring the wave height and the current direction and speed, comprising:

a floating body capable of floating on water;

a GPS antenna for receiving GPS signals;

a single GPS receiver for processing said GPS signals received by said GPS antenna and measuring three-dimensional absolute position;

a data recording unit for recording the position data relating to said three-dimensional position measured by said GPS receiver; and a transmitter for transmitting said position data, said GPS antenna, said GPS receiver, said data recording unit, and said transmitter being installed on said floating body, and a base station equipped with a receiver for receiving said position data transmitted from said transmitter and a data processing unit for processing said received position data and calculating the wave height and current direction and speed at the point where said floating body is floating.

6. The GPS system for measuring wave height and current direction and speed according to claim 5, wherein a processing software for conducting said high-pass filter processing and smoothing processing of said position data is installed in said data processing unit for calculating said wave height and current direction and speed.

7. A GPS system for measuring wave height and current direction and speed comprising:

a GPS device for measuring the wave height and the current direction and speed, comprising:

a floating body capable of floating on water;

a GPS antenna for receiving GPS signals;

a single GPS receiver for processing said GPS signals received by said GPS antenna and measuring three-dimensional absolute position;

a data recording unit for recording the position data relating to said three-dimensional position measured by said GPS receiver;

a data processing unit for processing said position data and calculating the wave height and the current direction and speed at the point where said floating body is floating; and a transmitter for transmitting the computed data relating to said wave height and said current direction and speed, said GPS antenna, said GPS receiver, said data recording unit, said data processing unit and said transmitter being installed on said floating body, and a base station equipped with a receiver for receiving said computed data transmitted from said transmitter.

8. The GPS system for measuring wave height and current direction and speed according to claim 7, wherein a processing software for conducting said high-pass filter processing and smoothing processing of said position data is installed in said data processing unit for calculating said wave height and current direction and speed.

9. A GPS device for measuring wave height and current direction and speed, comprising:

a floating body capable of floating on water;

a GPS antenna for receiving GPS signals;

a single GPS receiver for processing said GPS signals received by said GPS antenna and measuring three-dimensional absolute position; and a data recording unit for recording the position data relating to said three-dimensional position measured by said GPS receiver, wherein said GPS antenna, said GPS receiver, and said data recording unit are installed on said floating body;

wherein a data processing unit is installed on said floating body for processing said position data extracted from said data recording unit and calculating the wave height and current direction and speed at the point where said floating body is floating, and wherein a transmitter for transmitting the computed data relating to said wave height and the current direction and speed calculated by said data processing unit is installed on said floating body.

* * * * *